US012704116B2

(12) United States Patent
Rizzo et al.

(10) Patent No.: US 12,704,116 B2
(45) Date of Patent: Aug. 11, 2026

(54) METHOD AND SYSTEM FOR EFFICIENT HYDROGEN COMPRESSION

(71) Applicant: NUOVO PIGNONE TECNOLOGIE—S.R.L., Florence (IT)

(72) Inventors: Emanuele Rizzo, Florence (IT); Paola Di Festa, Florence (IT); Gianni Orsi, Florence (IT)

(73) Assignee: NUOVO PIGNONE TECNOLOGIE—S.R.L., Florence (IT)

( * ) Notice: Subject to any disclaimer, the term of this patent is extended or adjusted under 35 U.S.C. 154(b) by 0 days.

(21) Appl. No.: 18/994,969

(22) PCT Filed: Jul. 13, 2023

(86) PCT No.: PCT/EP2023/025320
§ 371 (c)(1),
(2) Date: Jan. 15, 2025

(87) PCT Pub. No.: WO2024/017496
PCT Pub. Date: Jan. 25, 2024

(65) Prior Publication Data

US 2026/0015996 A1 Jan. 15, 2026

(30) Foreign Application Priority Data

Jul. 20, 2022 (IT) ........................ 102022000015174

(51) Int. Cl.
*F03G 7/06* (2006.01)
*B01F 23/10* (2022.01)
*C01B 3/02* (2006.01)

(52) U.S. Cl.
CPC ............ *F03G 7/0646* (2021.08); *B01F 23/10* (2022.01); *C01B 3/02* (2013.01); *F03G 7/06112* (2021.08)

(58) Field of Classification Search
CPC ........... C01B 3/02; F03G 7/0646; B01F 23/10
See application file for complete search history.

(56) References Cited

U.S. PATENT DOCUMENTS 3,801,708 A 4/1974 Smith et al.
2022/0033983 A1* 2/2022 Higginbotham ........ C25B 15/02

FOREIGN PATENT DOCUMENTS

EP 3 789 616 A1 3/2021
WO WO-2005064122 A1 * 7/2005 ........... C01B 3/0005
WO 2020/119950 A1 6/2020

* cited by examiner

*Primary Examiner* — Nathaniel E Wiehe
*Assistant Examiner* — Daniel S Collins
(74) *Attorney, Agent, or Firm* — CANTOR COLBURN LLP

(57) ABSTRACT

The hydrogen compression system, comprises a source of gaseous hydrogen at a first pressure, and a mixing unit, adapted to mix hydrogen and an additional gaseous component at said first pressure, the additional gaseous component having an average molecular weight higher than hydrogen. A compression unit is adapted to compress a gaseous mixture comprising hydrogen and the additional gaseous component to a second pressure. A separation unit is fluidly coupled to the compression unit and adapted to separate compressed hydrogen from compressed additional gaseous component. An energy recovery arrangement is further provided to recover energy from the expansion of the compressed additional gaseous component from the second pressure to the third pressure. Disclosed is also a method for efficient hydrogen compression.

21 Claims, 10 Drawing Sheets

1
3
5
7
9
11
12
13
15
17
19
21
23
25
27
28
29
31
33
M
G
O2
H2
(P1)
CO2
(P2)
(P3)
PSEP

Fig.2
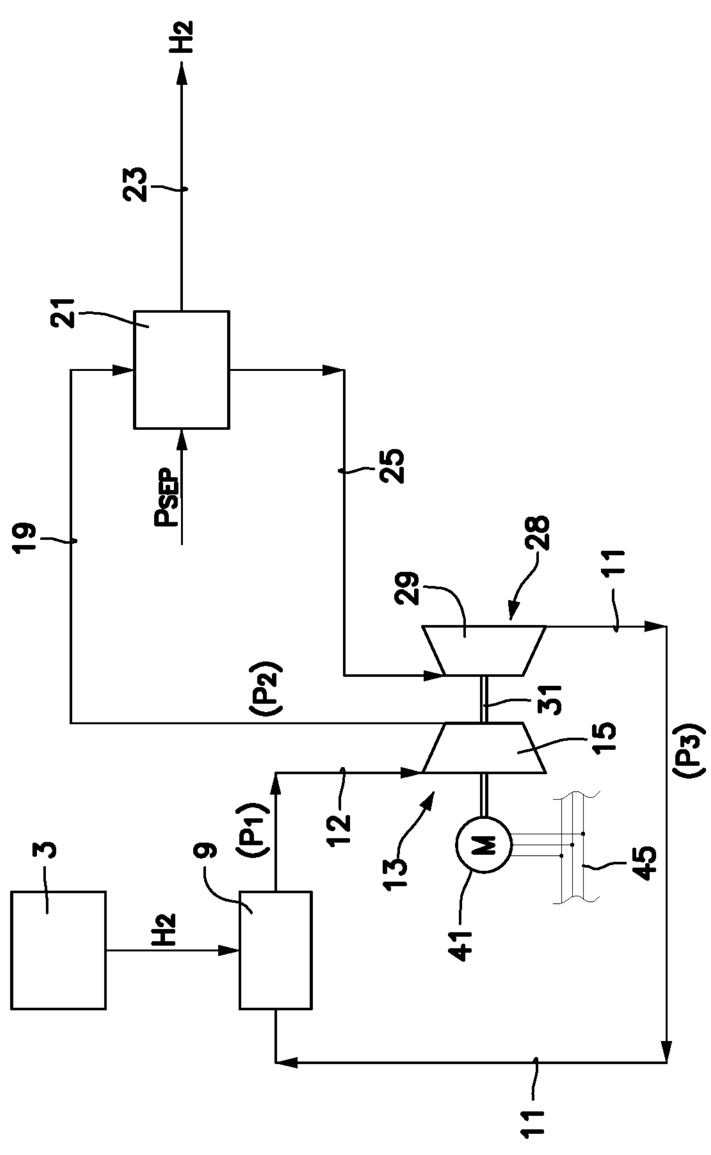
H2
23
21
19
PSEP
25
28
29
11
(P2)
31
15
(P3)
3
9
(P1)
12
13
M
41
45
H2
11

Fig.3
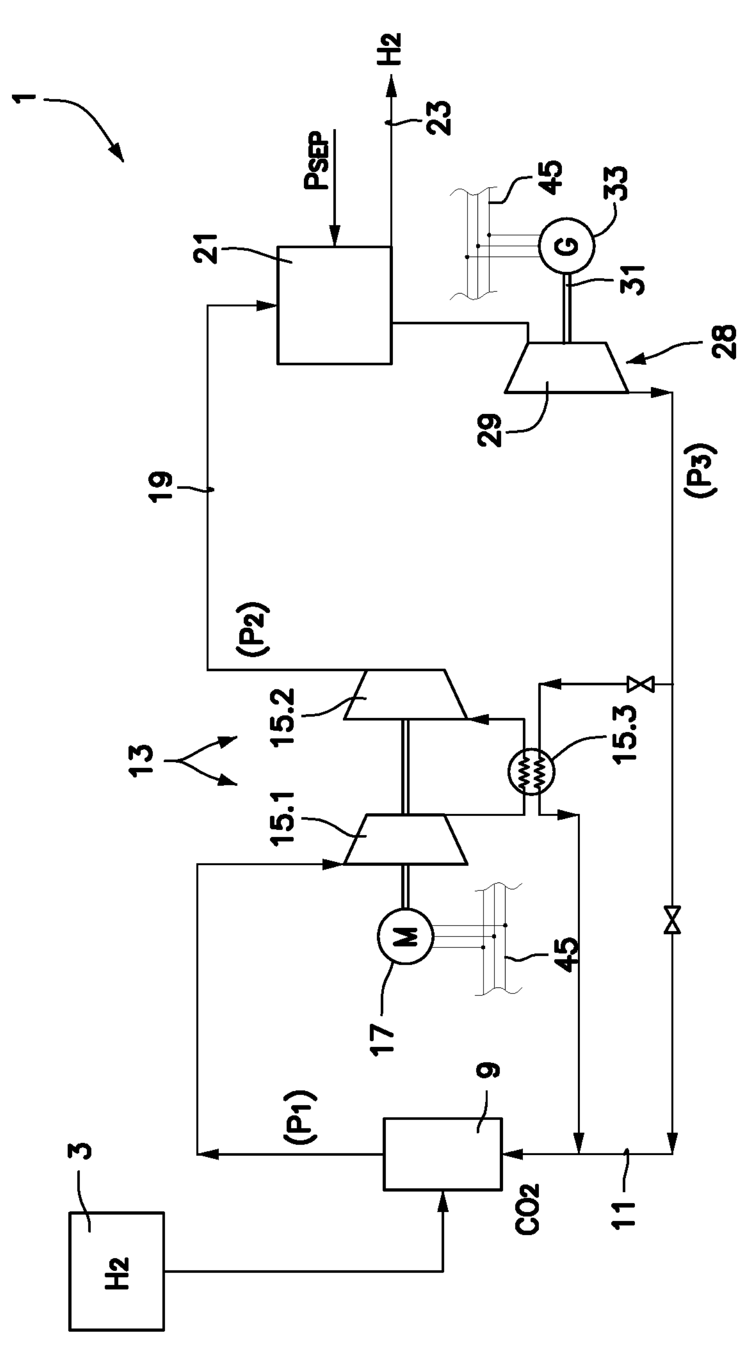
1
H2
23
PSEP
21
45
33
G
31
28
29
19
(P3)
(P2)
15.2
13
15.3
15.1
M
45
17
9
(P1)
3
H2
CO2
11

$CO_2$
44
53
57
45
G
$H_2$
21
23
27
28
55
$P_{SEP}$
25
29
19
43
59
61
CCS
51
15.2
13
15.3
31
15.1
9
M
41
$H_2$
3

Fig.8
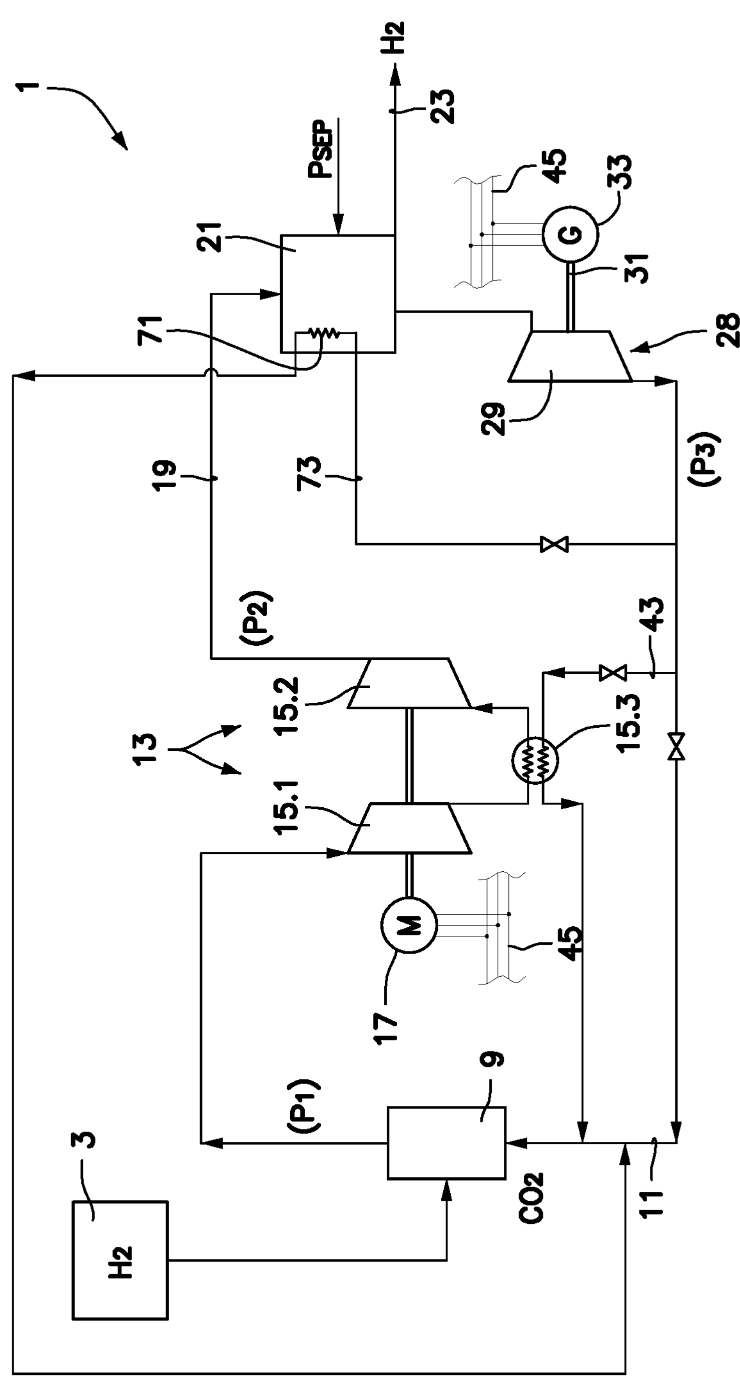
1
H2
23
PSEP
21
45
33
G
31
71
28
29
19
73
(P3)
(P2)
43
15.2
13
15.3
15.1
M
45
17
9
(P1)
3
H2
CO2
11

Fig.9
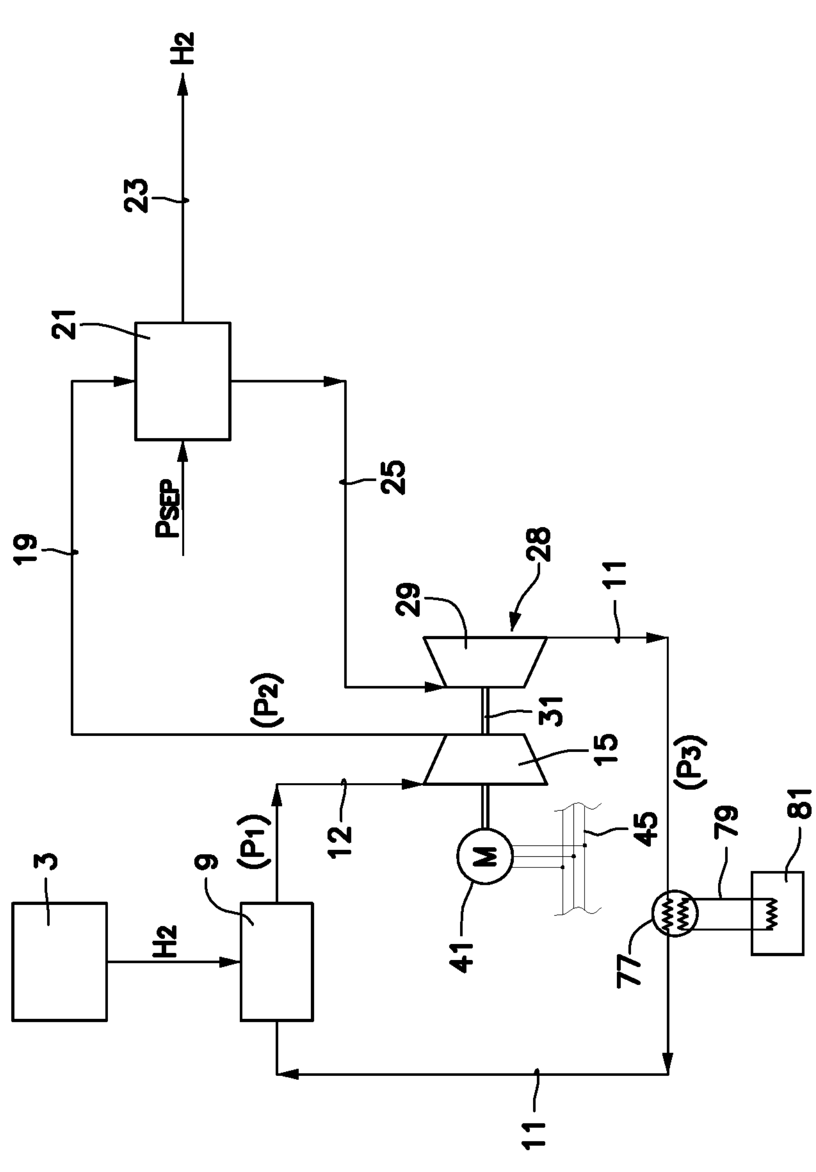

METHOD AND SYSTEM FOR EFFICIENT HYDROGEN COMPRESSION

TECHNICAL FIELD

The present disclosure concerns hydrogen processing. Embodiments disclosed herein specifically concern systems and methods for improved efficiency of hydrogen compression.

BACKGROUND ART

Hydrogen is used in many industrial applications. In recent years, interest towards hydrogen has increased, specifically in view of the possibility of using hydrogen as a fuel in replacement for natural gas in thermodynamic cycles, as well as a fuel in fuel cells.

Many applications require compression of hydrogen at high pressure values, around 200 bars or above. As a matter of fact, handling hydrogen at room pressure is not convenient due to the extremely low molecular weight of this gas. High pressure values must be achieved especially for transportation purposes, to increase the specific weight of the gas and therefore reduce the volumetric flowrate thereof.

However, compression of a low molecular weight gas, such as hydrogen, is technically challenging. Reaching pressure values up to 200 bar in a gas having a low molecular weight requires large amounts of power and is traditionally achieved through reciprocating compressors. These latter are characterized by relatively low flowrates and are therefore not convenient for processing large gas flowrates.

Large compression capacity requires the use of dynamic compressors, specifically centrifugal compressors, having large-diameter impellers, and high rotational speeds, leading to edge tip speed, as well as a large number of impeller stages arranged in sequence. These requirements render hydrogen dynamic compressors expensive and cumbersome.

In an attempt to make compression of hydrogen easier, it has been suggested to blend hydrogen with an additional gaseous component having a molecular weight higher than hydrogen. The resulting gaseous mixture has an average molecular weight higher than the molecular weight of hydrogen and is thus easier to compress even with smaller centrifugal compressors running at lower rotational speeds. The additional gaseous component is then separated from the compressed hydrogen. A system for enhanced hydrogen compression based on the use a heavier gaseous component blended in the hydrogen flow is disclosed in EP3789616.

Compression of the heavier gaseous mixtures and following gas components separation requires a process complexity that may lead to a less efficient overall result. A need therefore still exists, to optimize the blended hydrogen compression system providing better performances than traditional arrangements.

SUMMARY

For improving the efficiency of hydrogen compression, a hydrogen compression system is disclosed herein, which includes a mixing unit, adapted to mix hydrogen and an additional gaseous component at a first pressure, the additional gaseous component having an average molecular weight higher than hydrogen. The system further includes a compression unit, adapted to compress a gaseous mixture comprising hydrogen and the additional gaseous component to a second pressure. A separation unit, fluidly coupled to the compression unit, is adapted to separate compressed hydrogen from compressed additional gaseous component. An energy recovery arrangement is further provided, which includes an expansion unit fluidly coupled to the separation unit and adapted to depressurize the compressed additional gaseous component from the second pressure to a third pressure, lower than the second pressure. The energy recovery arrangement is adapted to recover energy from the expansion of the compressed additional gaseous component from the second pressure to the third pressure.

The recovered energy can be in form of thermal energy or mechanical energy. The mechanical energy can be converted into electric energy or used as such, to drive the compressor unit.

Thermal energy can be recovered in the form of cooled or chilled fluid, which can provide a cooling capacity for a process external to the compression system and/or to a process internal to the compression system. For instance, the additional gaseous component, recovered by separation from the mixture of hydrogen and additional gaseous component, and chilled by expansion, can be used to remove heat in an intercooler of the compression unit, to increase the compression efficiency. As an alternative, or in combination, expanded additional gaseous component at low temperature can be used to support the separation process in the separation unit, if a cryogenic separation process is used, for instance. Exploitation of the chilling capacity of the expanded additional gaseous component in a heat exchanger external to the hydrogen compression system may also be foreseen as an alternative or additional way of recovering energy from expansion of the additional gaseous component.

Further features of the system are outlined below and defined in the attached claims.

According to a further aspect, disclosed herein is a method for compressing hydrogen, the method comprising the following steps:

- mixing gaseous hydrogen and an additional gaseous component at a first pressure and forming a gaseous mixture, the additional gaseous component having an average molecular weight higher than hydrogen;
- compressing the gaseous mixture at a second pressure, higher than the first pressure, in a compression unit;
- separating compressed hydrogen and compressed additional gaseous component from one another;
- expanding the compressed additional gaseous component at a third pressure, lower than the second pressure, and recovering energy from the expansion of the compressed additional gaseous component.

Further embodiments and advantageous features of the method according of the present disclosure are outlined below and set forth in the attached claims.

BRIEF DESCRIPTION OF THE DRAWINGS

Reference is now made briefly to the accompanying drawings, in which:

FIG. 2 is a further embodiment of a hydrogen compression system;

FIG. 3 is a further embodiment of a hydrogen compression system;

FIG. 8 is a further embodiment of a hydrogen compression system;

FIG. 9 is a further embodiment of a hydrogen compression system; and

DETAILED DESCRIPTION

Figure 1:
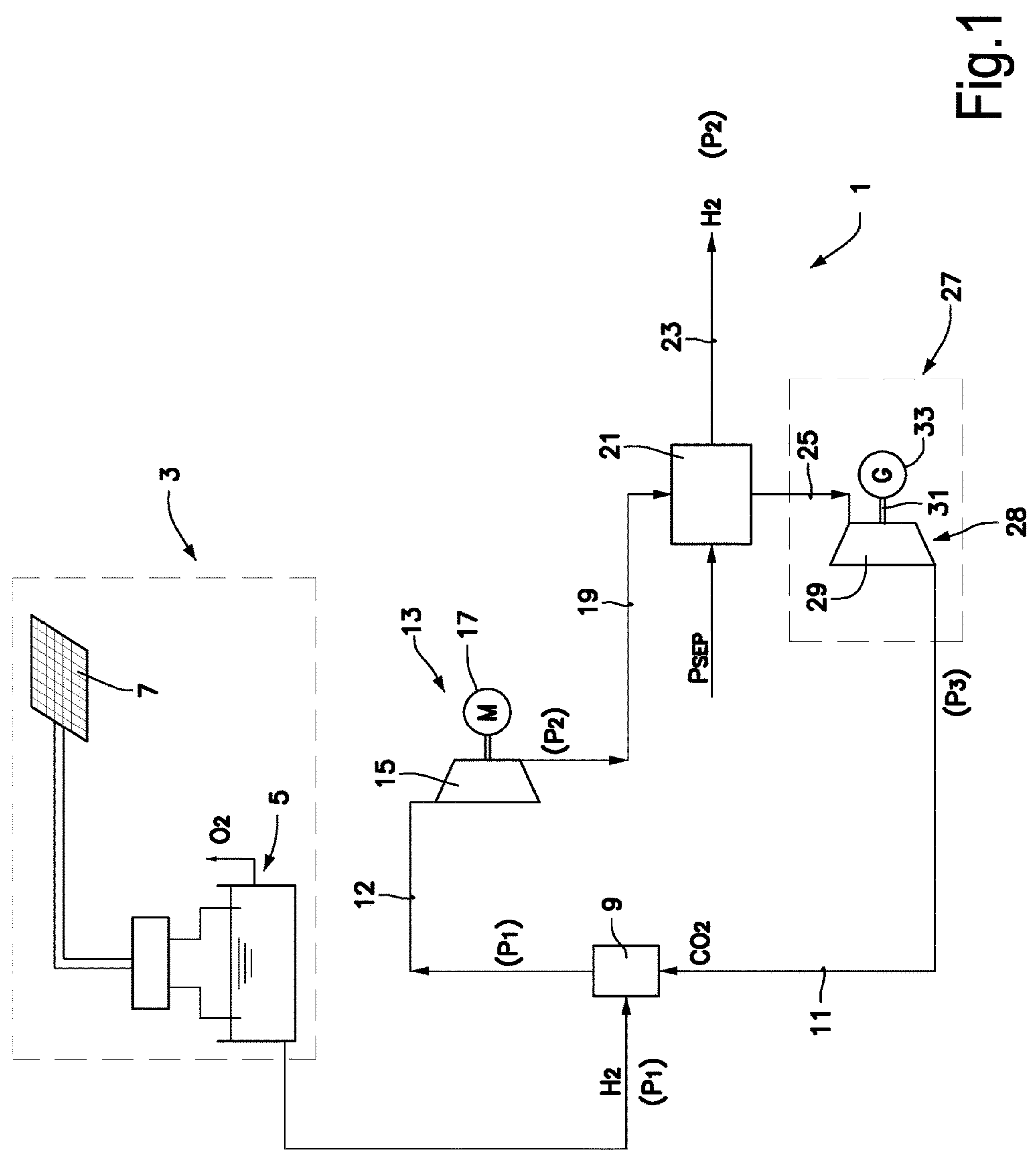
FIG. 1 is a schematic diagram of a hydrogen compression system in one embodiment.

A schematic diagram of a hydrogen compression system 1 is illustrated in FIG. 1. In this embodiment, the hydrogen compression system 1 includes a source of gaseous hydrogen 3. By way of example, the hydrogen source 3 of FIG. 1 includes a green hydrogen production unit, wherein hydrogen is produced using energy from a renewable energy resource. In the schematic of FIG. 1, the source of gaseous hydrogen 3 comprises an electrolyzer 5, which produces hydrogen and oxygen by electrolysis using electric energy generated by a photovoltaic field 7, a wind farm, a hydraulic turbine, a combination thereof, or any other energy generator using a energy from a renewable energy resource.

As a matter of fact, in other embodiments a different source of gaseous hydrogen can be used, for instance using steam reforming of natural gas or other light hydrocarbons, coal gasification, biomass gasification, methane pyrolysis or the like.

The system 1 further includes a mixing unit 9, where gaseous hydrogen delivered by the source of gaseous hydrogen 3 is mixed with an additional gaseous component. The additional gaseous component can be carbon dioxide ($CO_2$). The additional gaseous component flows in the mixing unit 9 from a delivery line 11, which can be part of a closed circuit, as described in more detail below.

While in the following description reference will often be made to carbon dioxide as additional gaseous component (also referred as "hydrogen dopant"), in more general terms, in several embodiments the additional gaseous component can be any gas or gas mixture, having an average molecular weight sufficiently higher than hydrogen. In some embodiments, the hydrogen compression system is combined with a carbon dioxide capture system or any other $CO_2$ producing process, and in that case the additional gaseous component will be (at least predominantly) carbon dioxide.

However, in other embodiments, and in particular when the system includes a closed circuit for the additional gaseous component, a gaseous component different from carbon dioxide can be used. For instance, the additional gaseous component may include a hydrocarbon or a mixture of hydrocarbons (CxHy), possibly in combination with carbon dioxide. In some embodiments, a mixture of carbon dioxide and propane can be used. In some embodiments, fluids commonly used in refrigerant circuits can be used as additional gaseous components to be mixed with hydrogen. For instance, a mixed refrigerant can be used as a dopant to be added to the hydrogen flow.

The average molecular weight (Mw) of the additional gaseous components, forming the hydrogen dopant, can depend upon the chemical nature of the components. For instance, an average between 16 and 20 can be suitable for a natural gas including hydrocarbons (CxHy), while a molecular weight between 30 and 40 and higher than 40 can be selected when refrigerant fluids possibly in combination with carbon dioxide are used.

The percentage of additional gaseous component in the mixture delivered from the mixing unit 9 can vary for instance between 30% to 70% by weight depending upon the nature and average molecular weight (Mw) of the additional gaseous components. Typically, if the hydrogen dopant is pure carbon dioxide, a percentage thereof ranging from 30% to 50% can be suitable. A remarkable reduction of power required to compress hydrogen can be achieved already with a carbon dioxide percentage of 30% by weight.

The mixing unit 9 is fluidly coupled through line 12 to a compression unit 13. The gas mixture in line 12 has a first pressure P1. If the hydrogen source 3 provides hydrogen at ambient pressure, then P1 is about 1 bar. However, in some embodiments the hydrogen source 3 may deliver hydrogen at a higher pressure, for instance around 20 bar or higher. This may be the case, e.g., when the electrolyzer is a high-pressure electrolyzer.

In the schematic diagram of FIG. 1 the compression unit 13 is shown as a single compressor 15 and a driver 17, e.g. an electric motor. In actual embodiments, the compression unit 13 may include a plurality of sequentially arranged compressors, forming one or more compressor trains, which may be driven by a single driver, or more than one driver.

In some embodiments, the compression unit 13 includes centrifugal compressors. Preferably, the compression unit 13 consists of one or more centrifugal compressors arranged in series. In some embodiments, not shown, a sequence of centrifugal and reciprocating compressors can be used, if needed or preferred.

The gas mixture delivered at the discharge side of the compression unit 13 is at a pressure P2, higher than P1. In some embodiments, the pressure P2 can be around 200 bar or higher, e.g. 300 bar or above.

The delivery side of the compression unit 13 is fluidly coupled through a line 19 to a separation unit 21, which is adapted to separate hydrogen from the additional gaseous component. A flow of compressed hydrogen, separated from the additional gaseous component, is an available product delivered through a compressed hydrogen delivery line 23, while a flow of compressed additional gaseous component flows through an additional gaseous component outlet line 25.

The separation unit 21 may include any separation device adapted to separate hydrogen from the additional gaseous component. The separation technology may be chosen among those available in the art, based on the chemical nature of the additional gaseous component, on the percentage thereof in the gaseous mixture, on the pressure of the gaseous mixture delivered by the compression unit 13, on the required flowrate, and on other technical considerations.

Exemplary embodiments of possible separation technologies, on which the separation unit 21 can be based, include (but are not limited to) pressure swing absorption, membrane separation, electrochemical hydrogen separation cryogenic separation, or combinations thereof. Power absorbed by the operation of the separation unit 21 is schematically indicated as Psep in the diagram of FIG. 1 and can be provided by any suitable power source.

The system 1 further includes an energy recovery arrangement 27. As will become apparent from the following description, the energy recovery arrangement 27 may include means to convert pressure energy from the compressed additional gaseous component and generate mechanical and possibly electrical energy therewith. However, by energy recovery arrangement 27 any device is understood herein, which is adapted to provide an energy contribution to the system 1 exploiting the flow of compressed additional gaseous component delivered by the separation unit 21. For instance, the additional gaseous component can be used to provide a cooling capacity by expansion thereof, adapted to increase the overall energy efficiency of the system 1.

The energy recovery device 27 includes an expansion device 28. In some embodiments the expansion device 28 can include a Joule-Thomson valve or any other static expansion device, to produce a flow of expanded and cold additional gaseous component, which can be used to provide cooling capacity. In preferred embodiments the expansion device 28 includes one or more expanders 29, for instance turbo-expanders, such as radial turbo-expanders, adapted to convert pressure energy of the additional gaseous component into mechanical power available on a shaft 31. In the embodiment of FIG. 1 the shaft 31 is drivingly coupled to an electric generator 33 adapted to convert mechanical power into electric power, which can be distributed to an electric user, for instance including the driver 17 of the compression unit 13, through an electric power distribution grid, not shown in FIG. 1.

In the exemplary embodiment of FIG. 1, the delivery side of the expander 29 is fluidly coupled to the mixing unit 9 through line 11. The pressure of the additional gaseous component in line 11 can be P3. In the exemplary embodiment of FIG. 1, P3=P1 and can be e.g. 1 bar or higher, for instance between 1 bar and 30 bar, depending upon the pressure at which hydrogen is made available from the hydrogen source 3.

The mixing unit 9, the compression unit 13, the separation unit 21 and the expander 29 form a closed circuit, wherein the additional gaseous component circulates and is cyclically compressed after blending with hydrogen, separated from the hydrogen and expanded.

With continuing reference to FIG. 1, a further embodiment of a hydrogen compression system 1 according to the present disclosure is shown in FIG. 2. The same reference numbers used in FIG. 1 are used in FIG. 2 to designate the same or equivalent parts, which will not be described in detail again.

The embodiment of FIG. 2 mainly differs from the embodiment of FIG. 1 in that mechanical power recovered from the expansion of the additional gaseous component after separation thereof in the separation unit 21 is used directly to drive the compression unit 13. This is pictorially represented by a mechanical connection through a shaft 31 between the expander 29 and the compressor 15. In some embodiments, an electric machine 41, electrically connected to an electric power distribution grid 45, is also arranged along the shaft line to provide additional mechanical power to drive the compressor 15 if the power recovered by expansion of the additional gaseous component in the expander 29 is not sufficient to drive the compressor 15. Excess power from the expander 29 may be converted by the electric machine 41 into electric power.

With continuing reference to FIGS. 1 and 2, FIG. 3 illustrates a further embodiment of a hydrogen compression system 1 of the present disclosure. The same reference numbers used in FIGS. 1 and 2 designate the same or equivalent parts in FIG. 3, which will not be described in detail again.

In the diagram of FIG. 3, the compression unit 13 is shown as including a first compressor or compressor stage 15.1 and a second compressor or compressor stage 15.2 arranged in series. For the sake of brevity, in the following description reference will be made simply to a first compressor and a second compressor. The delivery side of the first compressor 15.1 is fluidly coupled to the suction side of the second compressor 15.2. An intercooler 15.3 is arranged between the delivery side of the first compressor 15.1 and the suction side of the second compressor 15.2. The gaseous mixture containing hydrogen and the additional gaseous component is partially compressed in the first compressor 15.1 and cooled before being further compressed in the second compressor 15.2. The number of compressors arranged in series can be larger than two and a respective intercooler can be arranged between some or all the pairs of sequentially arranged compressors.

In some embodiments, as illustrated in FIG. 3, the partially compressed gaseous mixture containing hydrogen and additional gaseous component is cooled by heat exchange with a side stream of expanded additional gaseous component branched off from the discharge side of the expander 29. For this purpose, a branching-off line 43 connects the discharge side of the expander 29 to the cold side of the intercooler 15.3. After flowing through the intercooler 15.3 the branched-off stream of expanded additional gaseous component flows back to the mixing unit 9.

If needed, the full flow of expanded additional gaseous component delivered by the expander 29 can be used as a cooling medium in the intercooler(s) 15.3 or in any additional plant or process requiring a cooling capacity.

In the embodiment of FIG. 3, therefore, the expanding additional gaseous component separated from the compressed hydrogen in the separation unit 21 is used to increase the energy efficiency of the hydrogen compression system 1 in two ways. On the one side, pressure energy of the compressed additional gaseous component is converted into mechanical power, and then into electric power through the expander 29 and the generator 33. On the other side, the cold expanded additional gaseous component provides a chilling capacity to remove heat from the partially compressed gaseous mixture, thus improving the efficiency of the compression unit 13 and reducing the power needed for compressing the gaseous mixture from pressure P1 to pressure P2.

Figure 4:
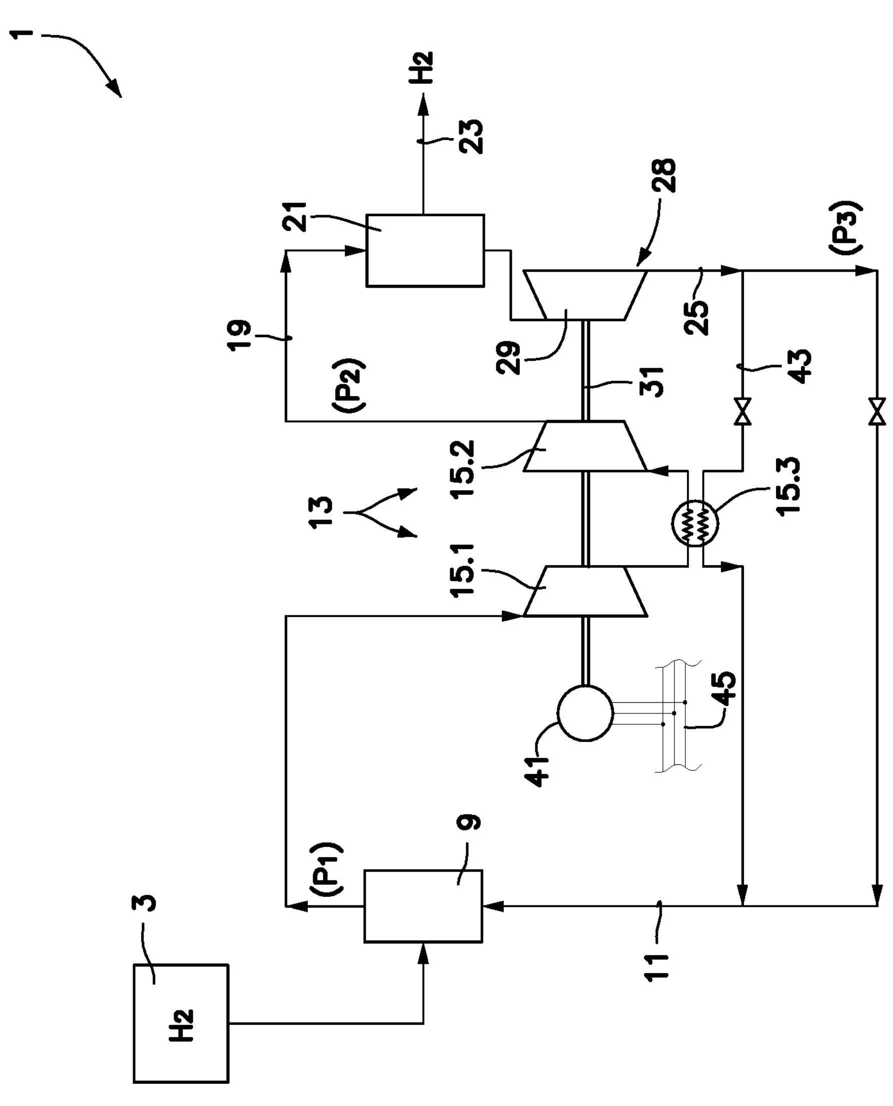
FIG. 4 is a further embodiment of a hydrogen compression system.

With continuing reference to FIGS. 1, 2 and 3, a further embodiment of the hydrogen compression system 1 according to the present disclosure is shown in FIG. 4. The same reference numbers used in FIGS. 1, 2 and 3 designate the same or equivalent parts in FIG. 4, which will not be described in detail again.

The hydrogen compression system 1 of FIG. 4 includes an intercooled compression unit 13, including by way of example a first compressor 15.1, a second compressor 15.2 and an intercooler 15.3, similarly to the embodiment of FIG. 3. Moreover, the expander 29 in FIG. 4 is drivingly coupled to the compression unit 13 through a shaft 31, such that mechanical power generated by expansion of the additional gaseous component in the expander 29 is directly used to drive the compression unit 13. An electric machine 41, electrically connected to an electric power distribution grid, can be arranged on the same shaft line to provide additional power for driving the compression unit or to convert mechanical power in excess from the expander 29 into electric power.

In the embodiments disclosed so far, the additional gaseous component circulates in a closed loop and is subject to cyclic thermodynamic transformations. In substance, the additional gaseous component is added to the hydrogen at pressure P1 in the mixing unit 9, the gaseous mixture is compressed at pressure P2 in the compression unit 13, the compressed additional gaseous component is separated from the compressed hydrogen in the separation unit 21 and the additional gaseous component is expanded back at pressure P1 in the expansion device 28 and finally returned in a closed loop to the mixing unit 9.

This, however, is not the only possible layout of the hydrogen compression system 1.

In some embodiments, the additional gaseous component can be processed through an open circuit, or through a circuit which is as such a closed circuit, but not directly connecting the expansion device 28 to the mixing unit 9.

For instance, a continuous flow of additional gaseous component is added to the hydrogen, compressed therewith and separated therefrom. The separated compressed additional gaseous component is at least partly expanded for energy recovery purposes and subsequently removed from the hydrogen compression system 1 as a side product thereof.

Figure 5:
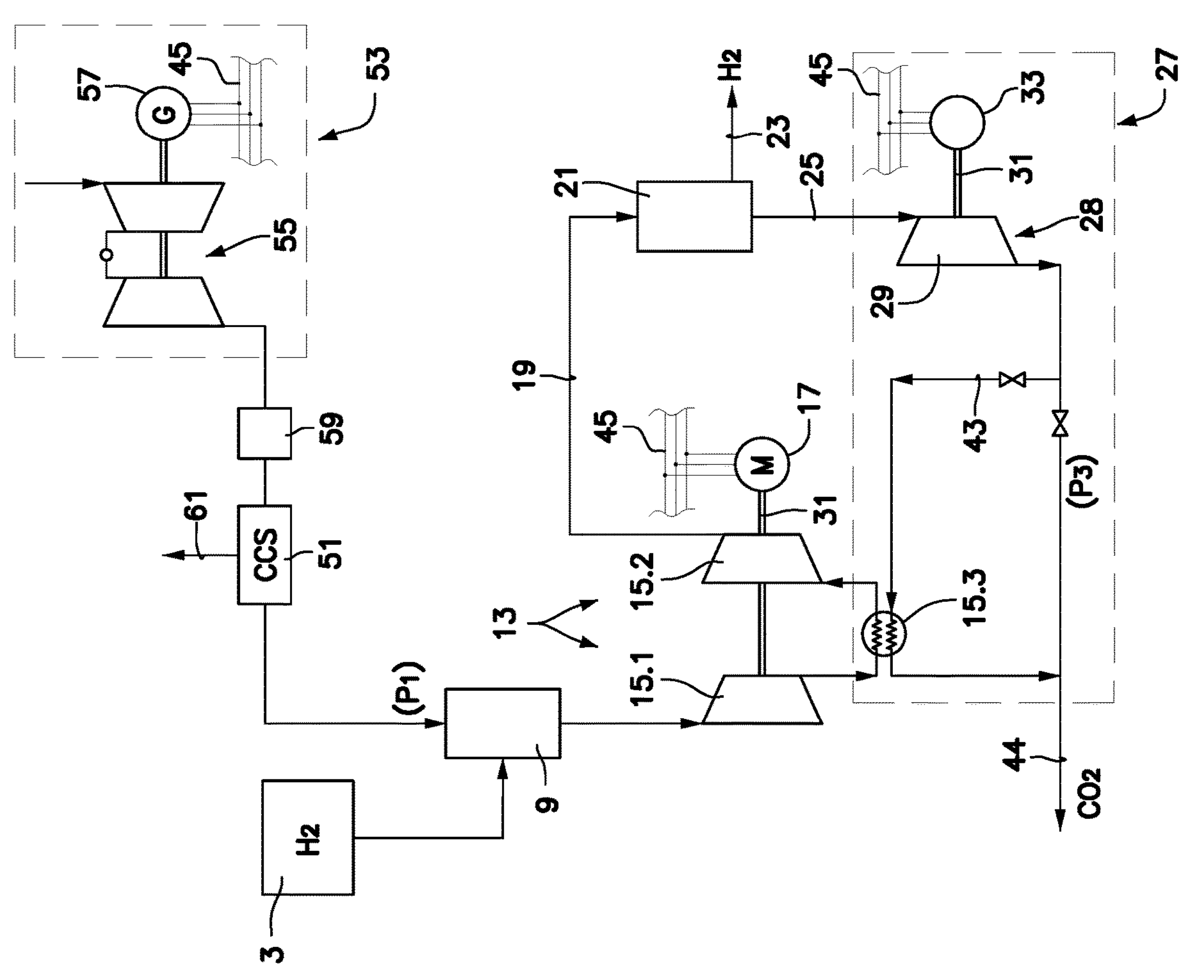
FIG. 5 is a further embodiment of a hydrogen compression system.

An embodiment including an open circuit for the additional gaseous component is shown in FIG. 5. In this embodiment, the additional gaseous component is carbon dioxide. The carbon dioxide can be delivered by a carbon dioxide capture system, which can be provided to process flue gas from an industrial process or a gas turbine and remove carbon dioxide therefrom before discharging the flue gas in the atmosphere. More generally, carbon dioxide can originate from any industrial process which generates carbon dioxide.

More specifically, referring to the embodiment of FIG. 5, the hydrogen compression system 1 includes a hydrogen source 3, and a mixing unit 9, where gaseous hydrogen delivered by the hydrogen source 3 is mixed with an additional gaseous component. In the embodiment of FIG. 5, the additional gaseous component is carbon dioxide ($CO_2$) delivered by a carbon dioxide capture system (shortly CCS: carbon capture system) labeled 51. The carbon dioxide capture system 51 can be an amine-based carbon dioxide abatement system, a mixed salt process, a chilled ammonia process, or any other process adapted to remove carbon dioxide from a flue gas produced by any industrial plant 53.

By way of non-limiting example, in FIG. 5 the plant 53 is a power generation plant including a gas turbine engine 55 powered with fossil fuel. The gas turbine engine 55 can be drivingly coupled to an electric generator 57 to convert mechanical power into electric power. The electric generator 57 is connected to an electric power distribution grid 45. In other embodiments, the gas turbine engine 55 can be used as a driver for another machine, for example a compressor train, or any other load.

Flue gas from the gas turbine engine 55 is processed in a gas cleaning facility 59 and subsequently processed in the carbon dioxide capture system 51, where carbon dioxide contained in the flue gas is captured and carbon dioxide-lean flue gas is discharged in the atmosphere (stack 61).

The carbon dioxide capture system 51 is fluidly coupled to the mixing unit 9 through a line 11, such that carbon dioxide from the carbon capture system 51 is mixed to hydrogen from the hydrogen source 3. In some embodiments, only a fraction of the carbon dioxide delivered by the carbon dioxide capture system 51 (or other $CO_2$-producing industrial process) will be delivered to the mixing unit 9.

The mixing unit 9 is in turn fluidly coupled through line 12 to a compression unit 13. The gas mixture in line 12 has a first pressure P1 and the compression unit 13 compresses the gas mixture at a second pressure P2. In some embodiments, the pressure P2 can be around 200 bar or higher, e.g., 300 bar or above In the diagram of FIG. 5 the compression unit 13 includes a compressor train comprising a first compressor 15.1 and a second compressor 15.2 with an intercooler 15.3 therebetween. A different number of compressors can be foreseen on the same or on different shaft lines of one or more compressor trains. In the exemplary embodiment of FIG. 5 a driver 17, e.g. an electric motor, drives into rotation the compressor train 15.1, 15.2 and is electrically connected to the electric power distribution grid 45.

The delivery side of the compression unit 13 is fluidly coupled through a line 19 to a separation unit 21, which is adapted to separate hydrogen from the carbon dioxide. A flow of compressed hydrogen, separated from the carbon dioxide, is delivered through a compressed hydrogen delivery line 23, while a flow of compressed carbon dioxide flows through carbon dioxide outlet line 25.

As already mentioned with regard to the previously described embodiments, the separation unit 21 may include any separation device adapted to separate hydrogen from the additional gaseous component. The separation technology may be chosen among those available in the art, based on the chemical nature of the additional gaseous component and on the percentage thereof in the gaseous mixture, on the pressure of the gaseous mixture delivered by the compression unit 13, on the required flowrate, and on other technical considerations.

The hydrogen compression system 1 further includes an energy recovery arrangement or section 27. In the embodiment of FIG. 5 the energy recovery arrangement or section 27 includes an expander 29, such as a radial turbo-expander, and a cooling circuit fluidly coupled to the intercooler 15.3. The expander 29 converts pressure energy of the compressed carbon dioxide into mechanical power. The cooling circuit provides cooling capacity to enhance the efficiency of the compression unit 13, as described above.

The mechanical power generated by the expander 29 is available on a shaft 31. In the embodiment of FIG. 5 the shaft 31 is drivingly coupled to an electric generator 33 adapted to convert mechanical power into electric power, which can be delivered to one or more electric loads, for instance including the driver 17 of the compression unit 13, through the electric power distribution grid 45.

In a way similar to the embodiment of FIGS. 3 and 4, in the hydrogen compression system 1 of FIG. 5 a branching-off line 43 connects the discharge side of the expander 29 to the cold side of the intercooler 15.3 to provide cooling capacity to the intercooler and improve the efficiency of the compression unit 13. After flowing through the intercooler 15.3 the branched-off stream of expanded additional gaseous component flows back to a main carbon dioxide discharge line 44. In other embodiments, the full stream of expanded carbon dioxide from the expander 19 can be used as a cooling medium, either in one or more intercoolers of the compression unit 13 or in a different process or device where cooling capacity is required.

In some embodiments, the carbon dioxide is expanded in the expander 29 of the expansion device 28 at a pressure P3, which is lower than the delivery pressure P2 of the compression unit 13, but higher than the pressure P1 of the carbon dioxide at the inlet of the mixing unit 9. In some embodiments, the expander 29 can be replaced by an expansion valve or, a generic static expansion device. For instance, pressure P1 can be around atmospheric pressure (1 bar), or more generally below 30 bar. The pressure P2 can be at or above 200 bar and the final expansion pressure P3 of the carbon dioxide can be above 50 bar, preferably around 70 bar. The partially expanded carbon dioxide is in suitable conditions for transportation or storage.

Similarly to the previously described embodiments, also in the embodiment of FIG. 5 at least part of the power used to compress the additional gaseous component (carbon dioxide) contained in the gaseous mixture processed by the compression unit 13 is recovered through expansion of the carbon dioxide from pressure P2 to pressure P3, thus improving the overall energy efficiency of the hydrogen compression system 1. The power required by the compression unit 13 is reduced by exploiting the cold expanded carbon dioxide flow as a chilling medium in the intercoolers, thus further improving the overall energy efficiency of the hydrogen compression system 1.

Figure 6:
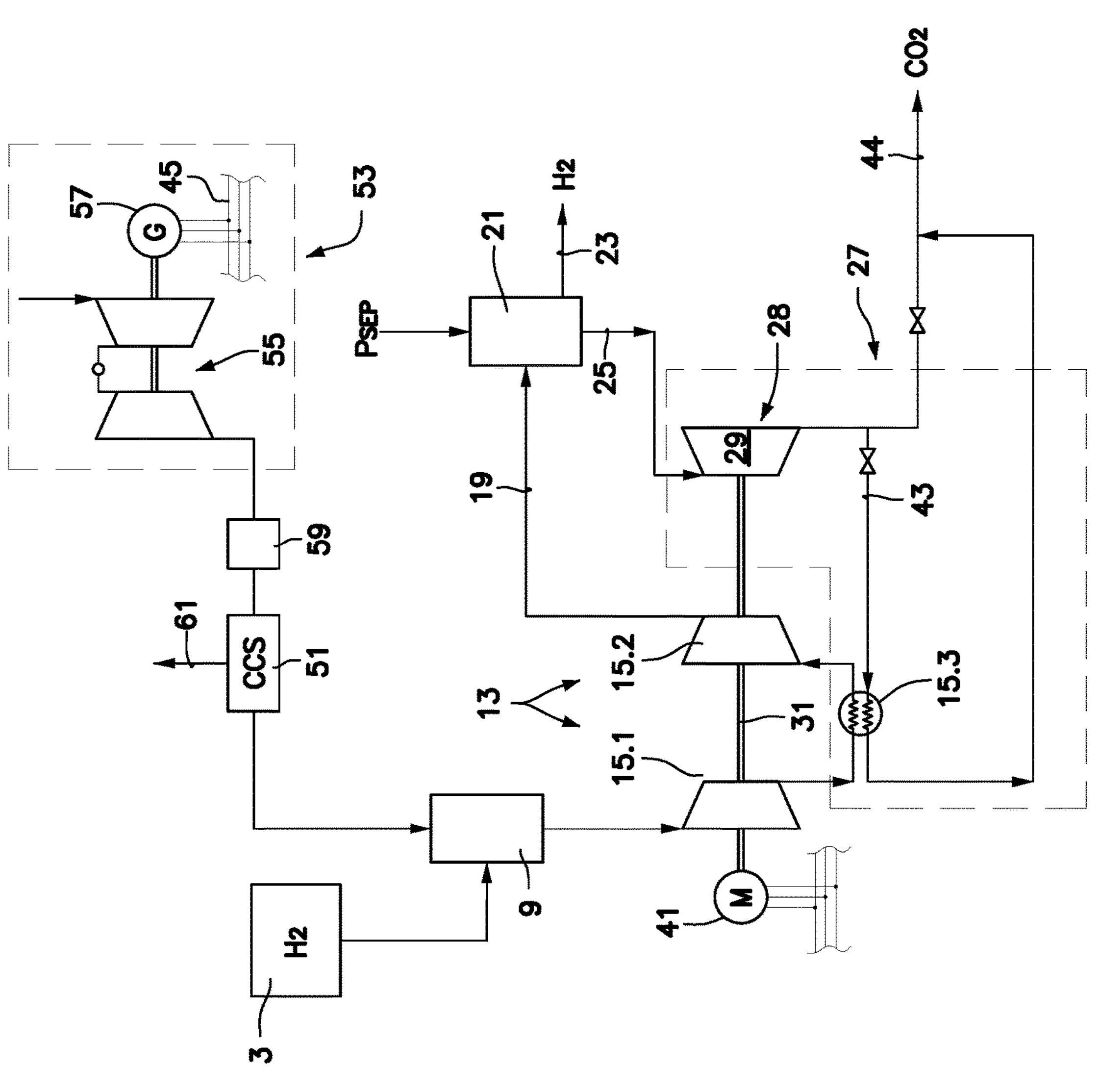
FIG. 6 is a further embodiment of a hydrogen compression system.

With continuing reference to FIGS. 1, 2, 3, 4 and 5, a further embodiment of a hydrogen compression system 1 of the present disclosure is shown in FIG. 6. The same reference numbers of FIG. 5 are used in FIG. 6 to indicate the same parts, which will not be described again in detail. The main difference between FIG. 5 and FIG. 6 is that, similarly to the embodiment of FIG. 4, the expander 29 is drivingly coupled through a shaft 31 to the compression unit 13, such that the mechanical power generated by expansion of the compressed carbon dioxide is used to directly drive the compression unit 13. An auxiliary electric machine 41, electrically connected to the electric power distribution grid 45, can be provided on the same shaft line to generate mechanical power if required to drive the compression unit 13, or to convert excess mechanical power from the expander 29 into electrical power.

With continuing reference to FIGS. 1, 2, 3, 4, 5 and 6, FIG. 7 illustrates a further embodiment of a hydrogen compression system 1 similar to the system of FIG. 5. The same reference numbers designate the same or similar components already described above, which will not be described again. The main difference with respect to FIG. 5 is the use of chilled expanded carbon dioxide from the expander 29 as a chilling medium to reduce power required by the separation unit 21. If this latter needs cooling of the gaseous hydrogen and carbon dioxide mixture to perform separation of the hydrogen, at least part of the chilling capacity can be provided by the expanded carbon dioxide delivered to a heat exchanger 71 in the separation unit 21 through a duct 73. Valves can be provided to suitably distribute the expanded chilled carbon dioxide flow through a by-pass line 75, through the intercooler 15.3 and through the separation unit 21, to adjust the expanded carbon dioxide flowrate according to needs.

The expanded carbon dioxide flow can be used as a chilling medium to reduce the power required by the separation unit 21 also in a closed-loop configuration similar to the one shown in FIGS. 1 to 4. An embodiment is schematically shown in FIG. 8, wherein the same reference numbers used in FIG. 4 designate the same or equivalent elements, which will not be described again. Similarly to the embodiment of FIG. 7, also in FIG. 8 a heat exchanger 71 in the separation unit 21 exploits chilled expanded carbon dioxide delivered through duct 73 from the delivery side of the expander 29. After cooling the gaseous mixture in the separation unit 21, the warmed-up carbon dioxide flow is returned to the mixing unit 9.

In general terms, cooling capacity provided by the flow of chilled and expanded carbon dioxide, or other additional gaseous component, at the delivery side of the expander 29 can be exploited in any process requiring a flow of cooling medium. This is schematically represented in FIG. 9, wherein a system similar to FIG. 2 is illustrated using the same reference numbers to designate the same elements. A generic heat exchanger 77 can be used to exploit the chilling capacity of the expanded additional gaseous component to cool a fluid flowing in a generic circuit 79 for a generic process 81. While in FIG. 9 the expander is combined with the compressor(s) on a single shaft line, in other embodiments, the expander can be mechanically separated from the compressor(s) and independent electric machines can be provided for the expander on the one side and for the compressor(s) on the other, as mentioned with regard to some of the previously described embodiments.

Figure 7:
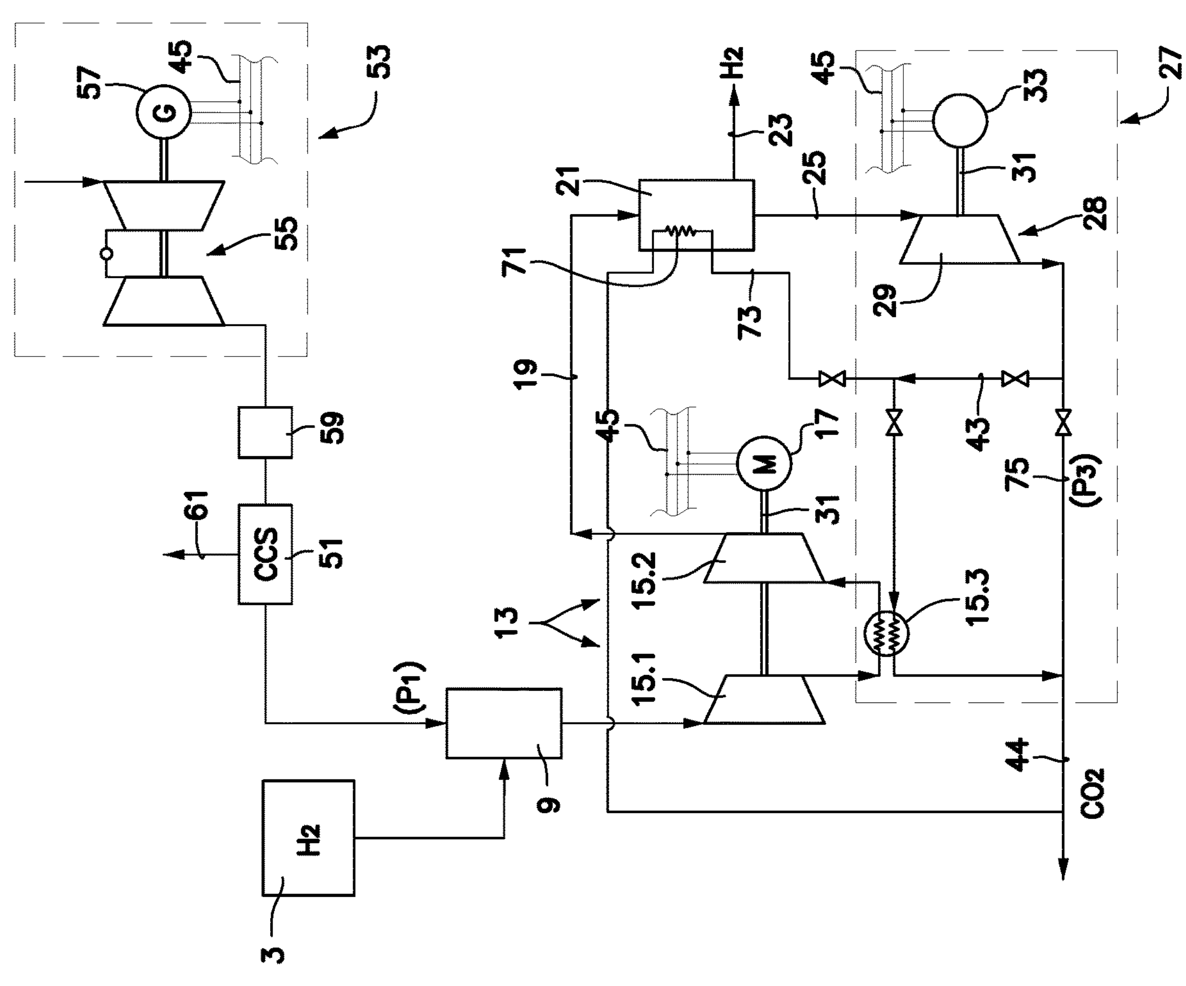
FIG. 7 is a further embodiment of a hydrogen compression system.

While in FIGS. 5, 6 and 7, a combination of a carbon dioxide capture system 51 with the mixing unit 9 has been described, where the carbon dioxide is originated from a gas turbine engine, as mentioned above the additional gaseous component can be a different gas or gas mixture, containing carbon dioxide or any other suitable gas, which can be mixed with hydrogen for compression purposes and separated therefrom, with a beneficial effect in terms of compression power saving.

Figure 10:
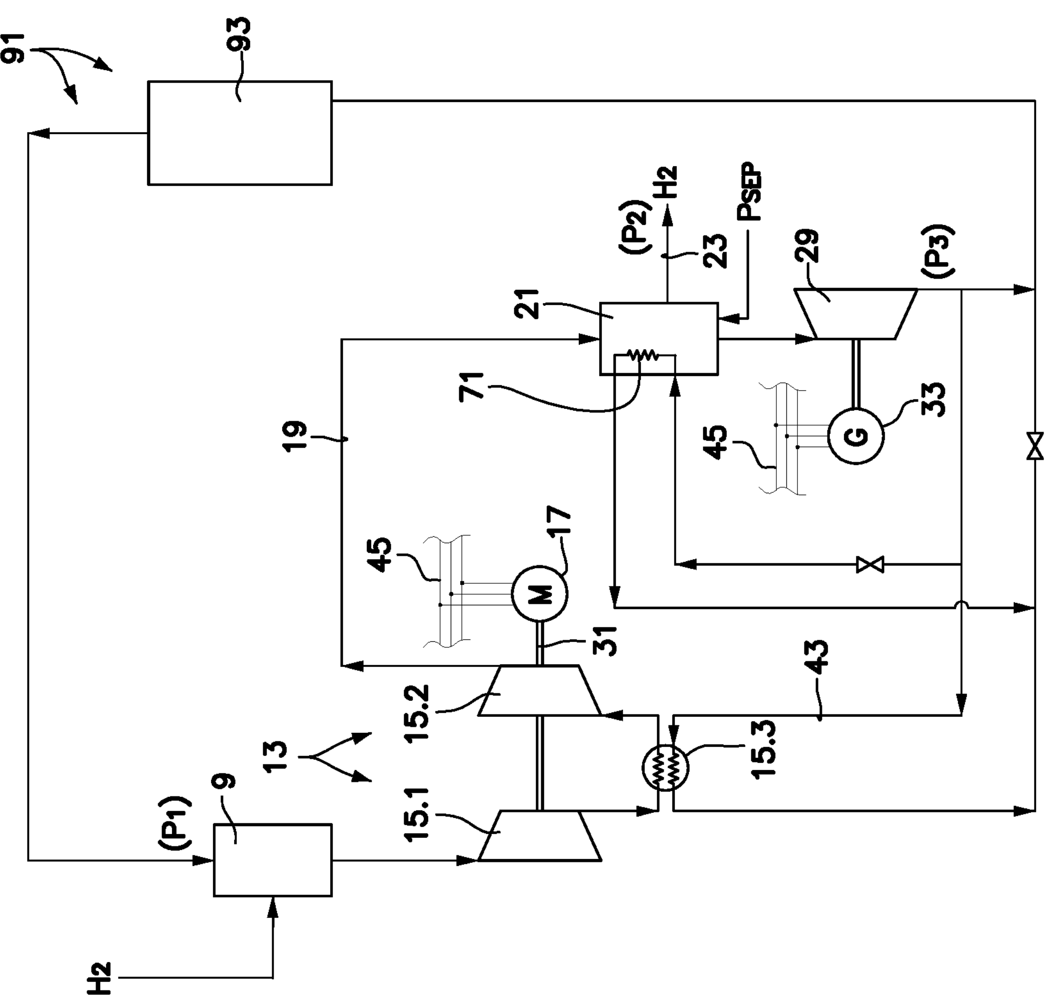
FIG. 10 is a yet further embodiment of a hydrogen compression system.

FIG. 10 illustrates a schematic diagram of a hydrogen compression system 1, wherein the additional gaseous component circulates in a separate circuit, which in turn can be open or closed (as shown by way of example), where a fluid circulates, adapted to be mixed with hydrogen for the above-mentioned purpose of compression power reduction. The same reference numbers already used in FIGS. 1 to 9 designate the same components or elements as described above, which will not be described in detail again. In FIG. 10 the expanded additional gaseous component is collected in a circuit 91, which may include a generic process 93. For instance, the additional gaseous component can be a refrigerant, for instance a mixed refrigerant, which is processed in a refrigeration circuit, for natural gas liquefaction or other purposes. The additional gaseous component circulates therefore in a closed circuit including the expansion device 28, wherefrom energy is recovered in form of thermal or mechanical/electrical power, as described above, such as to render the hydrogen compression process less power demanding and more efficient.

At the delivery side of the expansion device 28 the additional gaseous component can be in a gaseous state, in a liquid state or in a two-phase state, namely partially vapor and partly liquid. The state of the expanded additional gaseous component may depend, among others, by the chemical composition of the component, by the separation technique used in the separation unit 21, and/or by the pressure conditions.

In general terms, if the additional gaseous component is at least partly in a liquid state at outlet side of the separation unit 21, the expansion device 28 will usually include an expansion valve, instead of, or in addition to a turboexpander arranged downstream of the expansion valve. When expansion is performed in an expansion valve, rather than in a turbo-expander, energy recovery from the expanding or expanded additional component recovered in the separation unit 21 will mainly, or even exclusively be in the form of cooling capacity.

In some embodiments, for instance when an open cycle as illustrated in FIGS. 5, 6, 7 is provided, the additional gaseous component can be recovered in an at least partly liquefied form at the delivery side of the expansion device 28 and usefully exploited as a cooling medium or further condensed in a full liquid state for transportation purposes, for instance.

In a closed cycle, as shown in FIGS. 1, 2, 3, 4 and 9, a (partly) liquefied additional gaseous component at the delivery side of the expansion device 28 can be vaporized in the heat exchanger 71 of the separation unit 21 (see e.g. FIG. 8) and/or in an intercooler 15.3 (e.g. FIGS. 6, 7) and/or in a generic cooling heat exchanger 77 (FIG. 9) before being recycled to the mixing unit 9.

Exemplary embodiments have been disclosed above and illustrated in the accompanying drawings. It will be understood by those skilled in the art that various changes, omissions and additions may be made to that which is specifically disclosed herein without departing from the scope of the invention as defined in the following claims.

The invention claimed is:

1. A hydrogen compression system, comprising: a source of gaseous hydrogen;

a mixing unit fluidly coupled with the source of gaseous hydrogen through a hydrogen inlet, and further fluidly coupled with an inlet line adapted to feed an additional gaseous component to the mixing unit, the additional gaseous component having an average molecular weight higher than hydrogen; wherein the mixing unit is adapted to mix hydrogen from the source of gaseous hydrogen and the additional gaseous component at a first pressure and to form a gaseous mixture containing hydrogen and said additional gaseous component;

a compression unit, fluidly coupled with the mixing unit and adapted to compress the gaseous mixture to a second pressure, the compression unit comprising at least a first compressor or compressor stage, a second compressor or compressor stage, and an intercooler therebetween, and wherein the heat transfer circuit is adapted to provide cooling capacity to the intercooler and remove heat from a partially compressed mixture of hydrogen and the additional gaseous component by heat exchange with a stream of expanded additional gaseous component discharged from the expansion unit;

a separation unit, fluidly coupled with the compression unit and adapted to separate the compressed gaseous mixture into a flow of compressed hydrogen and a flow of compressed additional gaseous component;

a compressed hydrogen delivery line, wherethrough the flow of compressed hydrogen is removed from the system;

an energy recovery arrangement comprising an expansion unit fluidly coupled with the separation unit and adapted to depressurize the flow of compressed additional gaseous component from the second pressure to a third pressure, lower than the second pressure; wherein the energy recovery arrangement is adapted to recover energy from the expansion of the compressed additional gaseous component from the second pressure to the third pressure and includes a heat transfer circuit.

2. The hydrogen compression system of claim 1, wherein the energy recovery arrangement is adapted to recover thermal energy, mechanical energy or a combination thereof.

3. The hydrogen compression system of claim 1, wherein the expansion unit comprises an expander adapted to generate mechanical power by expansion of the compressed additional gaseous component.

4. The hydrogen compression unit of claim 3, wherein the expander is drivingly coupled to the compression unit, such that mechanical power generated by the expander is used to drive the compression unit.

5. The hydrogen compression unit of claim 3, wherein the expander is drivingly coupled to an electric generator adapted to convert mechanical power generated by the expander into electric power.

6. The hydrogen compression system of claim 1, wherein a delivery side of the expansion unit is fluidly coupled with the mixing unit; and wherein the mixing unit, the compression unit, the separation unit and the expansion unit form a closed circuit for the additional gaseous component.

7. The hydrogen compression system of claim 1, wherein the mixing unit is fluidly coupled with an open circuit, wherein the additional gaseous component flows.

8. The hydrogen compression system of claim 7, wherein the additional gaseous component comprises carbon dioxide recovered from a carbon dioxide generating process.

9. The hydrogen compression system of claim 7, wherein the third pressure is higher than the first pressure.

10. The hydrogen compression system of claim 1, wherein the compression unit comprises at least one dynamic compressor, preferably at least one centrifugal compressor.

11. The hydrogen compression system of claim 10, wherein the compression unit further comprises at least one reciprocating compressor.

12. A method for compressing hydrogen, the method comprising:

delivering a flow of gaseous hydrogen from a hydrogen source to a mixing unit;

delivering a flow of an additional gaseous component to the mixing unit; the additional gaseous component having an average molecular weight higher than hydrogen;

mixing the gaseous hydrogen and the additional gaseous component in the mixing unit and forming a gaseous mixture at a first pressure;

compressing the gaseous mixture at a second pressure, higher than the first pressure, in a compression unit;

delivering the compressed gaseous mixture to a separation unit and separating a flow of compressed hydrogen and a flow of compressed additional gaseous component from one another;

feeding the flow of compressed hydrogen through a compressed hydrogen delivery line; and expanding the compressed additional gaseous component at a third pressure, lower than the second pressure, recovering energy from the expansion of the compressed additional gaseous component and recovering thermal energy from the expansion of the additional gaseous component using expanded additional gaseous component as a chilling fluid in a heat exchanger.

13. The method of claim 12, wherein the step of expanding the compressed additional gaseous component comprises expanding the compressed additional gaseous component in an expander and generating mechanical power therewith.

14. The method of claim 13, further comprising the step of using said mechanical power to drive at least one of: said compression unit; and an electric machine, to convert mechanical power into electric power.

15. The method of claim 12, comprising one or more of the following steps: cooling partially compressed gaseous mixture during the phase of compressing the gaseous mixture up to the second pressure in heat exchange with expanded additional gaseous component; removing heat from a separation unit in which compressed hydrogen and compressed additional gaseous component are separated from one another by heat exchange with expanded additional gaseous component.

16. A method for compressing hydrogen, the method comprising the following steps, delivering a flow of gaseous hydrogen from a hydrogen source to a mixing unit;

delivering a flow of an additional gaseous component to the mixing unit; the additional gaseous component having an average molecular weight higher than hydrogen;

mixing the gaseous hydrogen and the additional gaseous component in the mixing unit and forming a gaseous mixture at a first pressure;

compressing the gaseous mixture at a second pressure, higher than the first pressure, in a compression unit the compressing comprising:

compressing the gaseous mixture at an intermediate pressure in a first compressor;

cooling the partially compressed gaseous mixture in an intercooler;

further compressing the gaseous mixture in a second compressor;

wherein heat is removed from the partially compressed gaseous mixture by heat exchange with expanded additional gaseous component;

delivering the compressed gaseous mixture to a separation unit and separating a flow of compressed hydrogen and a flow of compressed additional gaseous component from one another;

feeding the flow of compressed hydrogen through a compressed hydrogen delivery line; and expanding the compressed additional gaseous component at a third pressure lower than the second pressure, recovering energy from the expansion of the compressed additional gaseous component.

17. The method of claim 12, comprising the step of circulating the additional gaseous component in a closed circuit, and mixing the expanded additional gaseous component with the flow of gaseous hydrogen.

18. The method of claim 12, wherein the additional gaseous component comprises carbon dioxide.

19. The method of claim 18, wherein the flow of carbon dioxide is provided by a carbon dioxide generating process.

20. The method of claim 18, wherein the third pressure is higher than the first pressure.

21. The method of claim 12, wherein the step of compressing the gaseous mixture is performed in a compression system, comprising at least one centrifugal compressor, or a combination of at least one centrifugal compressor and at least one reciprocating compressor.

* * * * *